(12) United States Patent
Seki et al.

(10) Patent No.: US 7,497,451 B2
(45) Date of Patent: Mar. 3, 2009

(54) CUSHION MOUNTING STRUCTURE OF SADDLE-RIDE VEHICLE

(75) Inventors: Bunzo Seki, Saitama (JP); Shigeto Inami, Saitama (JP); Tsuneo Kajikawa, Saitama (JP); Tomoaki Yamagata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 300 days.

(21) Appl. No.: 11/390,152

(22) Filed: Mar. 28, 2006

(65) Prior Publication Data

US 2006/0220341 A1 Oct. 5, 2006

(30) Foreign Application Priority Data

Mar. 29, 2005 (JP) ............................. 2005-095889
Mar. 29, 2005 (JP) ............................. 2005-096272
Mar. 29, 2005 (JP) ............................. 2005-096273

(51) Int. Cl.
*B60G 3/04* (2006.01)
(52) U.S. Cl. ............................................. 280/124.134
(58) Field of Classification Search ................. 280/781, 280/124.15, 124.134, 124.135, 124.145, 280/124.151; 180/908
See application file for complete search history.

(56) References Cited

U.S. PATENT DOCUMENTS 5,080,389 A * 1/1992 Kawano et al. ....... 280/124.142
5,575,352 A * 11/1996 Suzuki et al. ............... 180/311
6,746,032 B2 * 6/2004 Seki ..................... 280/124.135
7,004,484 B1 * 2/2006 Chevalier ............... 280/86.751
2001/0028156 A1 * 10/2001 Handa ................... 280/93.512
2004/0021286 A1 * 2/2004 Bombardier et al. .. 280/124.134
2005/0217912 A1 * 10/2005 Kudo et al. ................ 180/89.1
2005/0253353 A1 * 11/2005 Yamamura et al. .... 280/124.135

FOREIGN PATENT DOCUMENTS

| JP | 57-60984 A | 4/1982 |
| JP | 1-109186 A | 4/1989 |
| JP | 2003-56607 A | 2/2003 |

\* cited by examiner

*Primary Examiner*—John Q. Nguyen
*Assistant Examiner*—Robert A. Coker
(74) *Attorney, Agent, or Firm*—Birch, Stewart, Kolasch & Birch, LLP (57) ABSTRACT

A cushion mounting structure of a saddle-ride vehicle with a cushion unit having an elongated stroke length for absorbing an impact from a wheel. The structure includes an upper and a lower arm constituting a suspension arm. The arms are tiltably connected to left and right portions of a support frame, the rear wheels being supported on the suspension arm. One end of a cushion unit is supported on the vehicle body frame, while the other end is supported on an upper arm by a link member and a push rod. The first end of the cushion unit is positioned inside the vehicle body frame in the vehicle body width direction, the second end of the cushion unit is positioned outside the vehicle body frame in a width direction, and an axis of the cushion unit extends in the longitudinal direction of the vehicle while intersecting the vehicle body frame.

15 Claims, 10 Drawing Sheets

CUSHION MOUNTING STRUCTURE OF SADDLE-RIDE VEHICLE

CROSS-REFERENCE TO RELATED APPLICATION

The present application claims priority under 35 U.S.C. §119 to Japanese Patent Application Nos. 2005-095889, 2005-096273, and 2005-096272, filed Mar. 29, 2005, the entire contents of which are hereby incorporated by reference.

BACKGROUND OF THE INVENTION

1. Field of the Invention

The present invention relates to a cushion mounting structure of a saddle-ride vehicle, and more particularly to a cushion mounting structure of a saddle-ride vehicle which is favorable to a three-wheeled vehicle or a four-wheeled vehicle which travels on a terrain.

2. Description of Background Art

Conventionally, as a rear wheel suspension structure in a saddle-ride vehicle which travels on a terrain, there has been known a double-wishbone-type independent suspension structure in which wheels are supported by suspension arms constituted of upper and lower arms. (For example, see JP-A-2003-56607.) Further, in the rear wheel suspension structure described in JP-A-2003-56607, an impact which left and right wheels receive is absorbed by a pair of cushion units which connects an upper end thereof to a vehicle body frame and a lower end thereof to a suspension arm and, at the same time, is arranged vertically with respect to a vehicle body in a side view, and is arranged in a chevron shape with respect to a vehicle body in a front view.

Here, in JP-A-2003-56607, although a stroke length which allows the mounting of the cushion unit obliquely in the vehicle body width direction is ensured, the elongation of the stroke length is limited due to the limitation imposed on a vehicle height and a vehicle width. Accordingly, there has been a demand for the acquisition of a favorable cushion performance by elongating the stroke length of the cushion unit.

Further, with respect to a motorcycle which includes a cushion unit for absorbing an impact on wheels, there has been known a motorcycle in which a link member which is tiltably arranged parallel to an arm member which supports a rear wheel is provided, the cushion unit is connected to an arm member by way of a link member thus ensuring a stroke length of the cushion unit in a narrow space and the acquisition of a favorable cushion performance in conformity with the tilting direction of the link member and the arm member. (See JP-A-57-60984, for example.)

Further, with respect to the motorcycle described in JP-A-57-60984, although the motorcycle possesses the favorable cushion performance with the use of the link member, the saddle-ride type vehicle which extends the suspension arm in the vehicle body width direction is also requested to acquire such favorable cushion performance with the use of the link member.

In addition, a saddle-ride type vehicle which travels on a terrain includes a vehicle body frame which is assembled by welding pipe-like frame members, wherein wheels are supported on the vehicle body frame by way of suspension arms.

Recently, to realize the easiness of assembling and the reduction of weight by the simplification of the structure, a so-called bolt-on type frame which is assembled by fastening and fixing a pair of divided frames which are split into left and right frames using bolts and nuts is adopted. (See JP-A-1-109186, for example.)

Here, in the frame structure disclosed in JP-A-1-109186, bulging portions in which hole portions for allowing bolts to pass therethrough are formed on outer peripheral sides of the divided frames, and these bulging portions are fastened and fixed to each other using bolts and nuts thus integrally forming the divided frames. Accordingly, there has been a drawback that an appearance of the vehicle is damaged by the bulging portions.

SUMMARY AND OBJECTS OF THE INVENTION

The present invention has been made under such circumstances and it is an object of the present invention to provide a cushion mounting structure of a saddle-ride type vehicle which can obtain a favorable riding comfort in a state that an impact from a wheel is surely absorbed by elongating a stroke length of a cushion unit with the use of a link member. A further object of the present invention is to provide a frame structure of a saddle-ride type vehicle which can easily integrally form a pair of divided frames while ensuring a favorable appearance.

According to a first aspect of the present invention, a cushion mounting structure of a saddle-ride type vehicle includes at least a pair of left and right wheels which includes a suspension arm which is tiltably connected to a vehicle body frame, extends in the vehicle body width direction, and suspends the wheels. Also includes is a cushion unit which includes a first end portion which is supported on the vehicle body frame and a second end portion which is supported on the suspension arm side, and absorbs an impact transferred to the wheels. The cushion unit is arranged such that the first end portion is positioned inside the vehicle body frame in the vehicle body width direction and the second end portion is positioned outside the vehicle body frame in the vehicle body width direction, and an axis thereof extends in the longitudinal direction of a vehicle body while intersecting the vehicle body frame. As a result, it is possible to elongate the stroke length of the cushion unit without difficulty. Further, it is possible to extremely smoothly absorb an impact from the wheel by the cushion unit whereby a favorable cushion performance can be obtained thus ensuring a favorable riding comfort.

According to a second aspect of the present invention, the cushion mounting structure further includes a step which extends to the outside the vehicle body frame in the vehicle body width direction, and the first end portion of the cushion unit is arranged approximately inside the step in the vehicle body width direction. Since the first end portion of the cushion unit is arranged approximately inside the step in the vehicle body width direction on which a driver places his/her foot during traveling and hence, it is possible to arrange the cushion unit having the elongated stroke length in the longitudinal direction of the vehicle body whereby it is possible to obtain the more favorable cushion performance.

According to a third aspect of the present invention, a gathering portion to which a plurality of frame members are connected is mounted on the vehicle body frame, and the first end portion of the cushion unit is mounted on the gathering portion. Since the first end portion of the cushion unit is mounted on the gathering portion of the vehicle body frame to which the plurality of frame members are connected and hence, it is possible to surely support the cushion unit which absorbs the impact from the wheel at the gathering portion having the high rigidity whereby the rigidity of the vehicle body frame can be enhanced.

According to a fourth aspect of the present invention, an escape portion which prevents the suspension arm from interfering with the cushion unit which extends and contracts is formed in the suspension arm. Since, the escape portion which prevents the interference between the cushion unit which extends and contracts and the tilting link member is formed in the suspension arm and hence, it is possible to smoothly extend and contract the cushion unit while preventing the cushion unit from interfering with the suspension arm whereby the more favorable cushion performance can be obtained.

According to a fifth aspect of the present invention, a cushion mounting structure of a saddle-ride type vehicle includes a suspension arm which is tiltably connected to a vehicle body frame and suspends wheels on left and right portions thereof, and a cushion unit which has a first end portion thereof supported on the vehicle body frame and a second end portion thereof supported to the suspension arm side and absorbs an impact transferred to the wheels. The cushion mounting structure includes a rod which is tiltably mounted on the suspension arm, and a link member which is supported on the rod, the second end portion of the cushion unit and the vehicle body frame, and the link member is tiltable in the direction different from the tilting direction of the suspension arm, and is arranged such that the first end portion and the second end portion of the cushion unit are positioned in a displaced manner in the longitudinal direction of a vehicle body, and hence, an axis of the cushion unit extends in the longitudinal direction of the vehicle body. As a result it is possible to elongate a stroke length of the cushion unit without difficulty whereby an impact from the wheel can be extremely smoothly absorbed by the cushion unit, thus enabling the acquisition of the favorable cushion performance and ensuring the favorable riding comfort.

According to a sixth aspect of the present invention, the link member is arranged substantially parallel to the cushion. Hence, it is possible to arrange the cushion unit having the elongated stroke length along the longitudinal direction of the vehicle body frame without difficulty thus enabling the acquisition of the more favorable cushion performance.

According to a seventh aspect of the present invention, the first end portion of the cushion unit is positioned inside in the vehicle body width direction of the vehicle body frame. Hence, it is possible to arrange the cushion unit having the elongated stroke length along the longitudinal direction of the vehicle body frame without difficulty thus enabling the acquisition of the more favorable cushion performance.

According to an eighth aspect of the present invention, the mounting portion of the link member on the vehicle body frame is positioned at the portion of the vehicle body behind the first end portion of the cushion unit. Hence, it is possible to arrange the mounting portion close to the second end portion of the cushion unit so as to make a tilting radius of the link member attributed to a stroke of the cushion unit small, whereby it is possible to enhance the cushion performance due to the favorable tilting operation of the link member.

According to a ninth aspect of the present invention, the escape portion which prevents the suspension arm from interfering with the tilting link member is formed in the suspension arm, and hence it is possible to tilt the link member smoothly by preventing the link member from interfering with the suspension arm whereby the more favorable cushion performance can be obtained.

According to a tenth aspect of the present invention, the cushion mounting structure further includes the stabilizer which is connected to the link member, and hence, compared to a case in which the stabilizer connects the suspension arms to each other, it is possible to simplify the structure of the suspension arm and the stabilizer can be also machined easily.

According to an eleventh aspect of the present invention, the stabilizer is inserted into the space portion formed by the vehicle body frame, the link member and the cushion unit, and hence it is possible to arrange the stabilizer in the vehicle body width direction without difficulty whereby it is possible to effectively make use of the space.

According to a twelfth aspect of the present invention, the rod is connected to the suspension arm using the ball joint. Thus, it is possible to smoothly transmit the behavior of the suspension arm to the link member by way of the rod and, at the same time, it is possible to ensure the favorable behavior of the suspension arm. According to a thirteenth aspect of the present invention, a frame structure of a saddle-ride type vehicle includes a pair of left and right divided frames which are joined to each other in an abutting manner and respectively include suspension arm support portions which support a suspension arm which suspends wheels. A fixing portion which joins the pair of divided frames is provided more inside than outer peripheries of the pair of left and right divided frames and, at the same time, in the vicinity of the suspension arm support portions. Hence, it is possible to surely fix the pair of divided frames. Further, since the fixing portion is formed in a state that the fixing portion is concealed by the suspension arm, it is possible to enhance the appearance of the saddle-ride type vehicle. Further, since the fixing portion is provided in the vicinity of the suspension arm support portion, it is possible to enhance the rigidity of the suspension arm support portion.

According to a fourteenth aspect of the present invention, at least one fixing portion which joins the pair of divided frames is covered with another member. Hence, it is possible to enhance the appearance of the saddle-ride type vehicle.

According to a fifteenth aspect of the present invention, at least one fixing portion which joins the pair of divided frames is covered with the suspension arm support portions. As a result, it is possible to enhance the appearance of the saddle-ride type vehicle and, at the same time, it is possible to enhance the rigidity of the suspension arm support portion.

According to a sixteenth aspect of the present invention, the respective fixing portions of the pair of divided frames are joined using bolts and nuts, and the bolts and the nuts are arranged in a state that the bolts and the nuts are not projected from outer surfaces of the divided frames. Hence, it is possible to further enhance the appearance of the saddle-ride type vehicle.

According to a seventeenth aspect of the present invention, a chain which transmits a drive force to the wheels is arranged between the pair of divided frames, and the fixing portion is arranged at a position away from a trajectory of the chain. Thus, it is possible to prevent the fixing portion from interfering with the chain.

According to an eighteenth aspect of the present invention, at least one of the pair of divided frames includes a boss portion which is formed in the inside of a vehicle body. Hence, there is no possibility that a periphery of the chain is completely covered with the divided frames, whereby the maintenance property can be enhanced. At the same time, the rigidity of the pair of divided frames can be ensured.

According to a nineteenth aspect of the present invention, the boss portion is formed on an extension line of the fixing portion for joining the pair of divided frames. Hence, it is possible to simplify the inner constitution of the pair of divided frames. Since there is no possibility that the periphery of the chain is completely covered with the divided frames, the maintenance property can be enhanced. Further, it is also possible to ensure the rigidity of the pair of divided frames.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

A plan view and a cross-sectional view for explaining the structure of a ball joint.

DETAILED DESCRIPTION OF THE PREFERRED EMBODIMENTS

Hereinafter, a mode for carrying out the present invention is explained in conjunction with attached drawings. Here, the drawings are viewed in the direction of symbols. The explanation of parts, which are in the left-and-right symmetry, is made with respect to the parts on one side, and the same symbols are given to corresponding parts on another side, and the explanation of the parts on another side is omitted.

Figure 1:
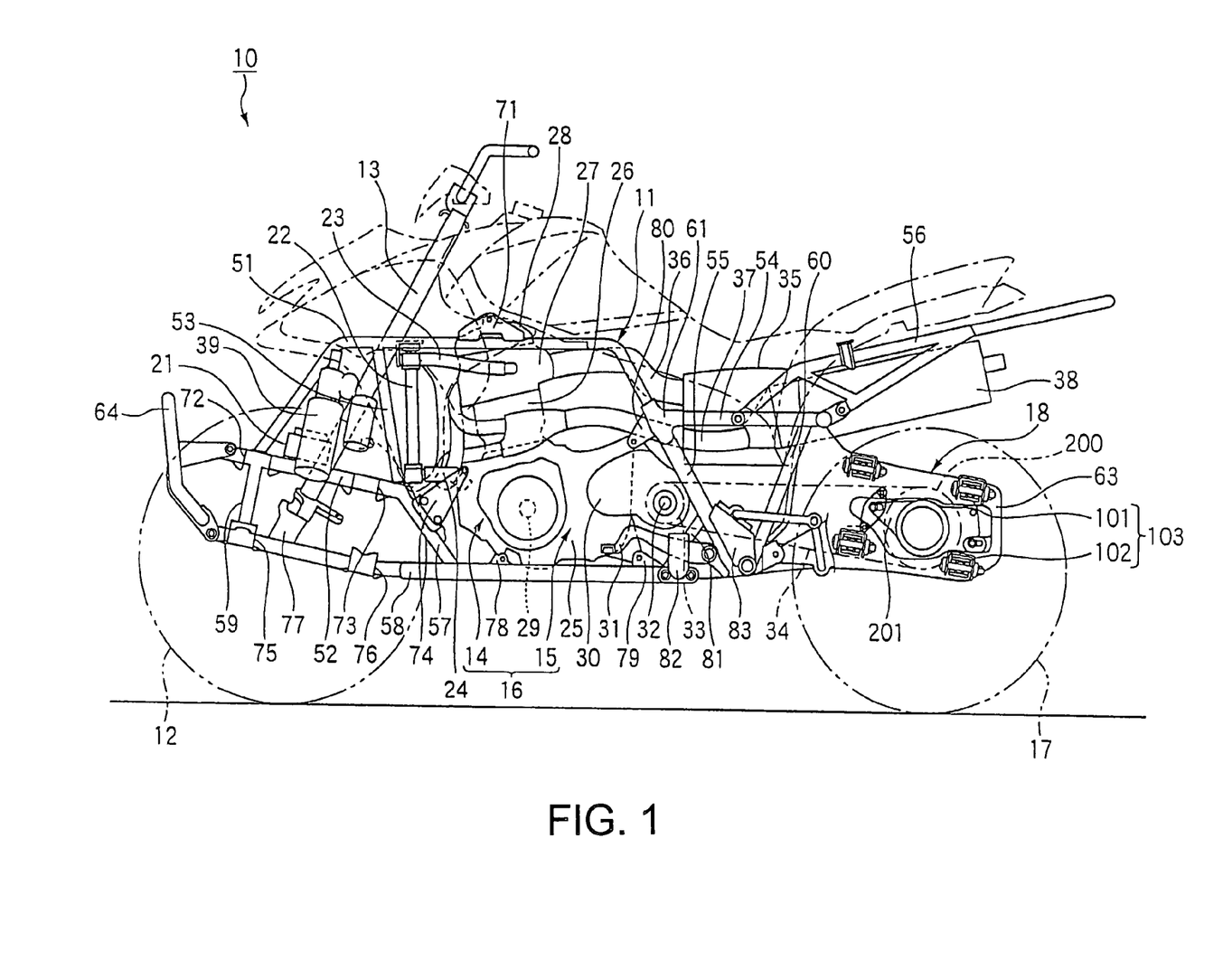
FIG. 1 is a side view of a saddle-ride type vehicle to which the cushion mounting structure of a vehicle of the present invention is applied.
Figure 2:
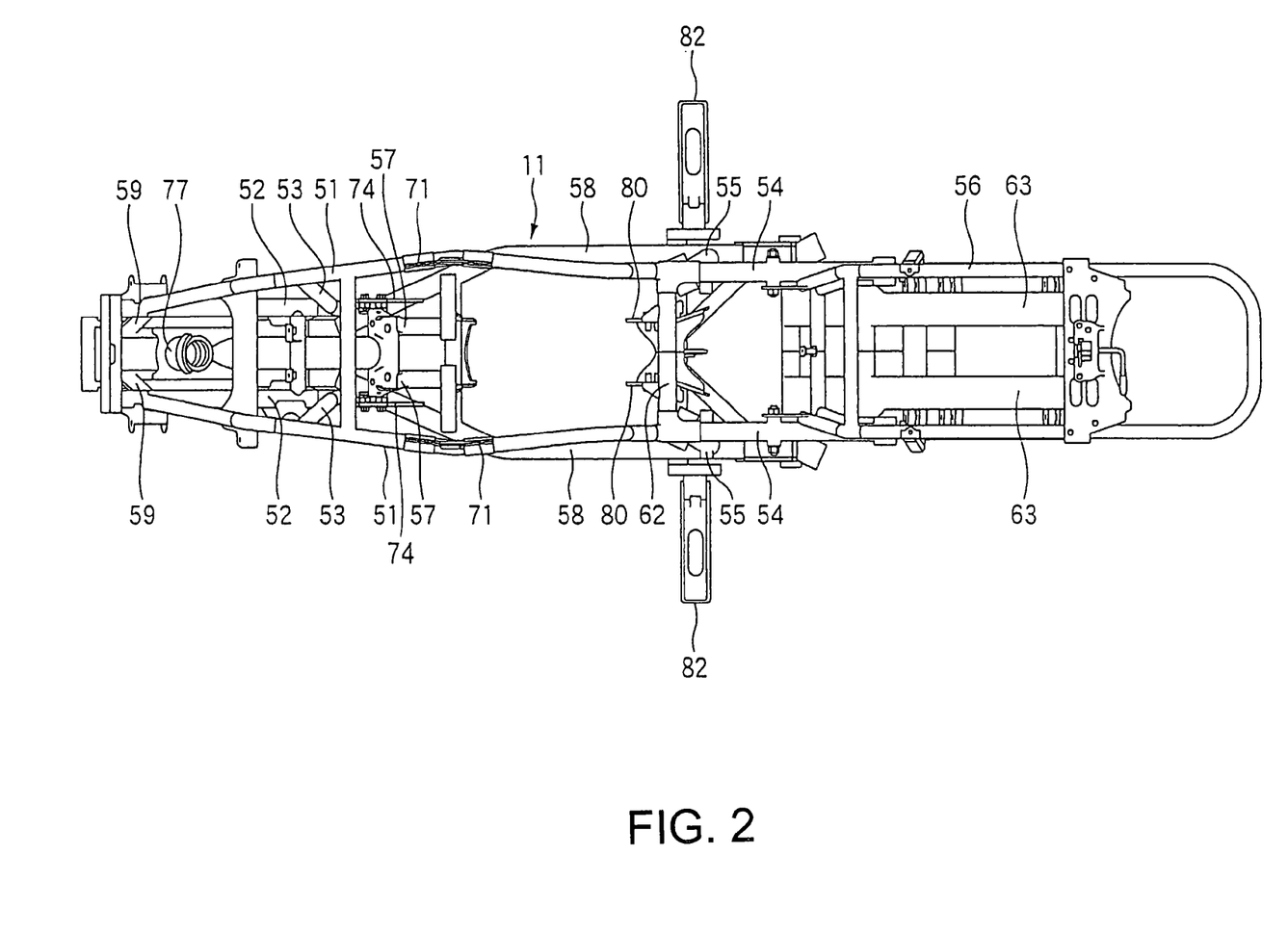
FIG. 2 is a top plan view showing a vehicle body frame of the saddle-ride type vehicle of the present invention.

FIG. 1 is a left side surface view of a saddle-ride type vehicle according to the present invention, and FIG. 2 is a top plan view which shows a vehicle body frame. A saddle-ride type vehicle 10 is a four-wheeled vehicle for traveling on a terrain and is a vehicle in which a steering shaft 13 for steering left and right front wheels 12 is mounted on a front portion of the vehicle body frame 11, a power unit 16 which is constituted of an engine 14 and a transmission 15 is mounted on a center portion of the vehicle body frame 11, a drive force transmitting portion 18 for transmitting a drive force to left and right rear wheels 17 is mounted on a rear portion of the vehicle body frame 11.

FIG. 1 also illustrates a battery 21, a radiator 22, radiator hoses 23, 24 which are connected to the radiator 22 and the engine 14, a crankcase 25, a cylinder block 26, a cylinder head 27, a head cover 28, a crankshaft 29, a reduction gear unit 30 which is mounted on the transmission 15, a shift pedal 31 for performing a transmission manipulation, an output shaft 32 of the reduction gear unit 30, a drive sprocket wheel 33 which is mounted on the output shaft 32, a chain 34 which is wound around the drive sprocket wheel 33, an air cleaner 35 which is connected to the cylinder head 27 by way of a connecting tube 36, an exhaust pipe 37 which extends in the rearward direction from the cylinder head 27, a muffler 38 which is connected to a rear end of the exhaust pipe 37, and a front cushion unit 39 which absorbs an impact to the left and right front wheels 12 from the ground.

As shown in FIG. 1 and FIG. 2, the vehicle body frame 11 includes a pair of left and right front upper frames 51 which are bent in a crest shape, a pair of left and right front middle frames 52 which are connected to front ends of the front upper frames 51, a pair of left and right front first oblique frames 53 which are obliquely extended between rear ends of the front middle frames 52 and front portions of the front upper frames 51, a pair of left and right rear upper frames 54 which substantially horizontally extend in the rearward direction from rear ends of the front upper frames 51, rear first oblique frames 55 which extend obliquely from rear end portions of the front upper frames 51 in the rearward direction and in the downward direction, and seat rails 56 which are connected to center portions and rear ends of the rear upper frames 54.

Further, the vehicle body frame 11 includes a pair of left and right front lower first frames 57 which obliquely extend from rear ends of the front middle frames 52 in the downward direction, a pair of left and right lower frames 58 which extend longitudinally in a state that the lower frames 58 are connected to lower ends of the front lower first frames 57 and lower ends of the rear first oblique frame 55, a pair of left and right front lower second frames 59 which are extended between a front portion of the front middle frame 52 and a front portion of the lower frame 58, and a pair of left and right rear second oblique frames 60 which are extended between a rear end of the lower frame 58 and a rear end of the rear upper frame 54.

Further, the vehicle body frame 11 includes a connecting frame 62 (see FIG. 2) which connects a pair of left and right joint members 61 to each other and constitutes a gathering portion to which the rear end of the front upper frame 51, the front end of the rear upper frame 54, and the upper end of the rear first oblique frame 55 are joined, and a pair of left and right support frames 63 which are supported in the vicinity of a portion where the rear end of the rear upper frame 54 and the upper end of the rear second oblique frame 60 are connected to each other and in the vicinity of a portion where the rear end of the rear first oblique frame 55, the rear end of the lower frame 58 and the lower end of the rear second oblique frame 60 are connected to each other. Here, numeral 64 indicates front guard members which are respectively mounted on the front end of the front middle frame 52 and the front end of the lower frame 58.

The front upper frames 51 include first brackets 71 which respectively support the power unit 16. The front middle frames 52 include upper arm support portions 72, 73 which vertically swingably mount upper arms (not shown in the drawings) which respectively support the left and right front wheels 12. Further, the front lower first frames 57 include second brackets 74 which support the power unit 16.

The lower frames 58 include lower arm support portions 75, 76 which vertically swingably mount lower arms (not shown in the drawings) which respectively support the left and right front wheels 12 on front portions thereof and, at the same time, the lower frames 58 include a steering shaft lower portion support member 77 which supports a lower portion of the steering shaft 13. Further, the lower frames 58 include a third bracket 78 and a fourth bracket 79 which support the power unit 16 on intermediate portions thereof. Further, the connecting frame 62 includes a fifth bracket 80 which supports the power unit 16.

In the vicinity of portions where the rear ends of the lower frames 58 and the rear ends of the first oblique frames 55 are connected to each other, a pair of left and right reinforcing frames 81 is connected. Further, to the lower frames 58, in the vicinity of portions where the lower frames 58 are connected to the reinforcing frames 81, a pair of left and right steps 82 which extend to the outside in the vehicle body width direction and on which a rider places his/her feet thereon during traveling are fixed. Further, at corner portions of the portions where the rear ends of the rear first oblique frames 55 and the lower ends of the rear second oblique frames 60 are connected to each other, a pair of left and right reinforcing plates 83 is fixed.

On the pair of left and right support frames 63, a final gear casing 201 which rotatably supports a driven sprocket 200 around which a chain 34 is wound is mounted. Further, a suspension arm 103 which is constituted of an upper arm 101 and a lower arm 102 is tiltably connected to both side surfaces of the pair of left and right support frames 63, and the support frames 63 extend in the vehicle body width direction and suspend the left and right rear wheels 17 respectively.

Figure 3:
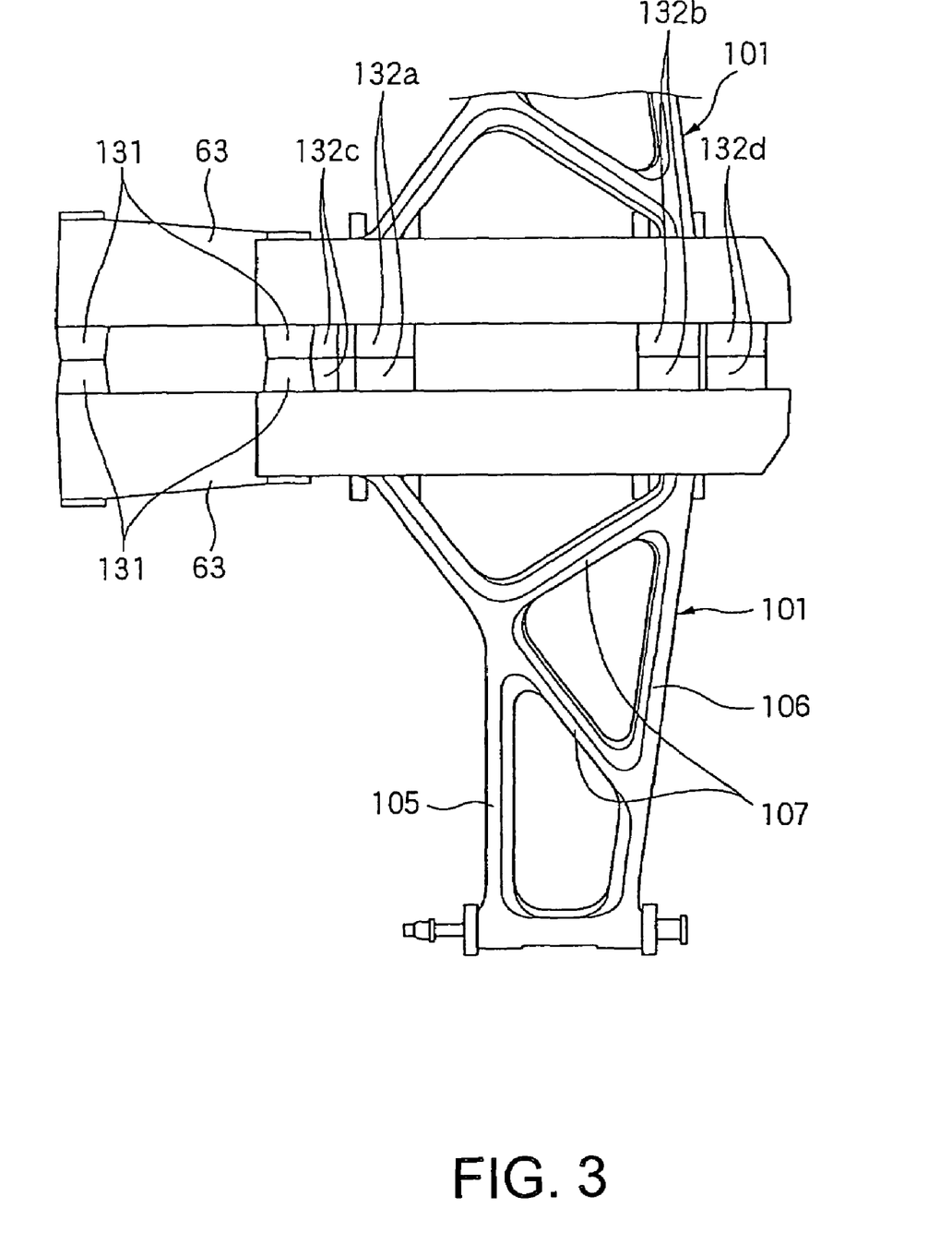
FIG. 3 is a top plan view for explaining the structure of a support frame.
Figure 4:
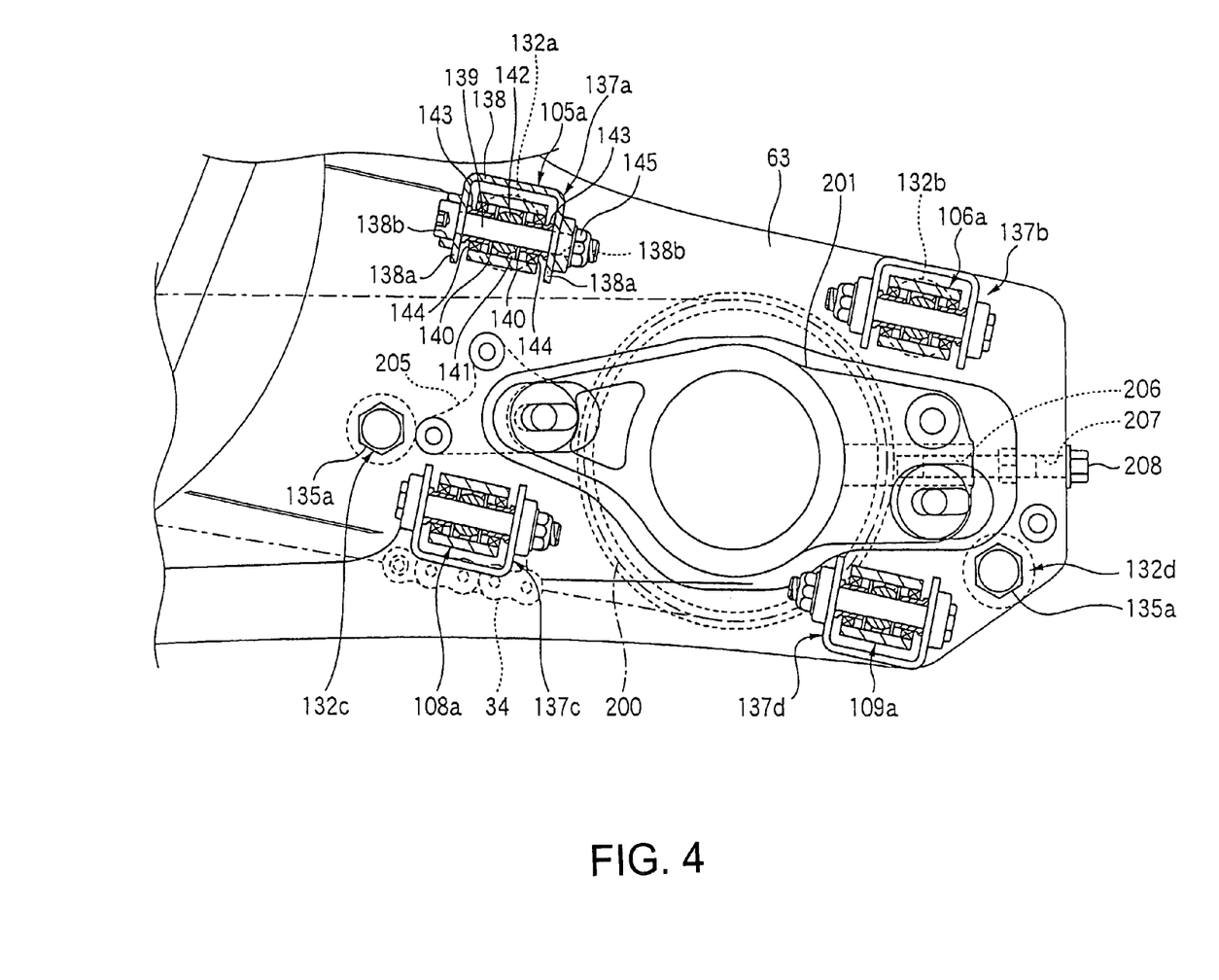
FIG. 4 is a side view for explaining the structure of a support frame.

FIG. 3 is a top plan view which explains the structure of the support frame, and FIG. 4 is a side view which explains the structure of the support frame. As shown in FIG. 3, the pair of left and right support frames 63 is formed of divided frames which are joined to each other in a state that the left and right support frames 63 abut on each other, and both of the divided frames are integrally formed by casting. On front sides of the support frames 63, positioning bosses 131 which are mounted in the vicinity of portions where the rear ends of the rear upper frames 54 and the upper ends of the rear second oblique frames 60 are connected to each other and in the vicinity of portions where the rear ends of the lower frames 58 and the lower ends of the rear second oblique frames 60 are connected to each other are formed at positions where the positioning bosses 131 face each other in an opposed manner. By allowing the respective positioning bosses 131 to abut on each other, both of the support frames 63 on which the respective positioning bosses 131 are formed are positioned.

Further, as shown in FIG. 3 and FIG. 4, on the respective support frame 63, four fixing bosses 132a, 132b, 132c, 132d which constitute fixing portions projecting from oppositely facing surface of the support frame 63 are formed, wherein by allowing the respective support frames 63 to abut on each other, end surfaces of the respective fixing bosses 132a, 132b, 132c, 132d are brought into contact with each other.

Figure 5:
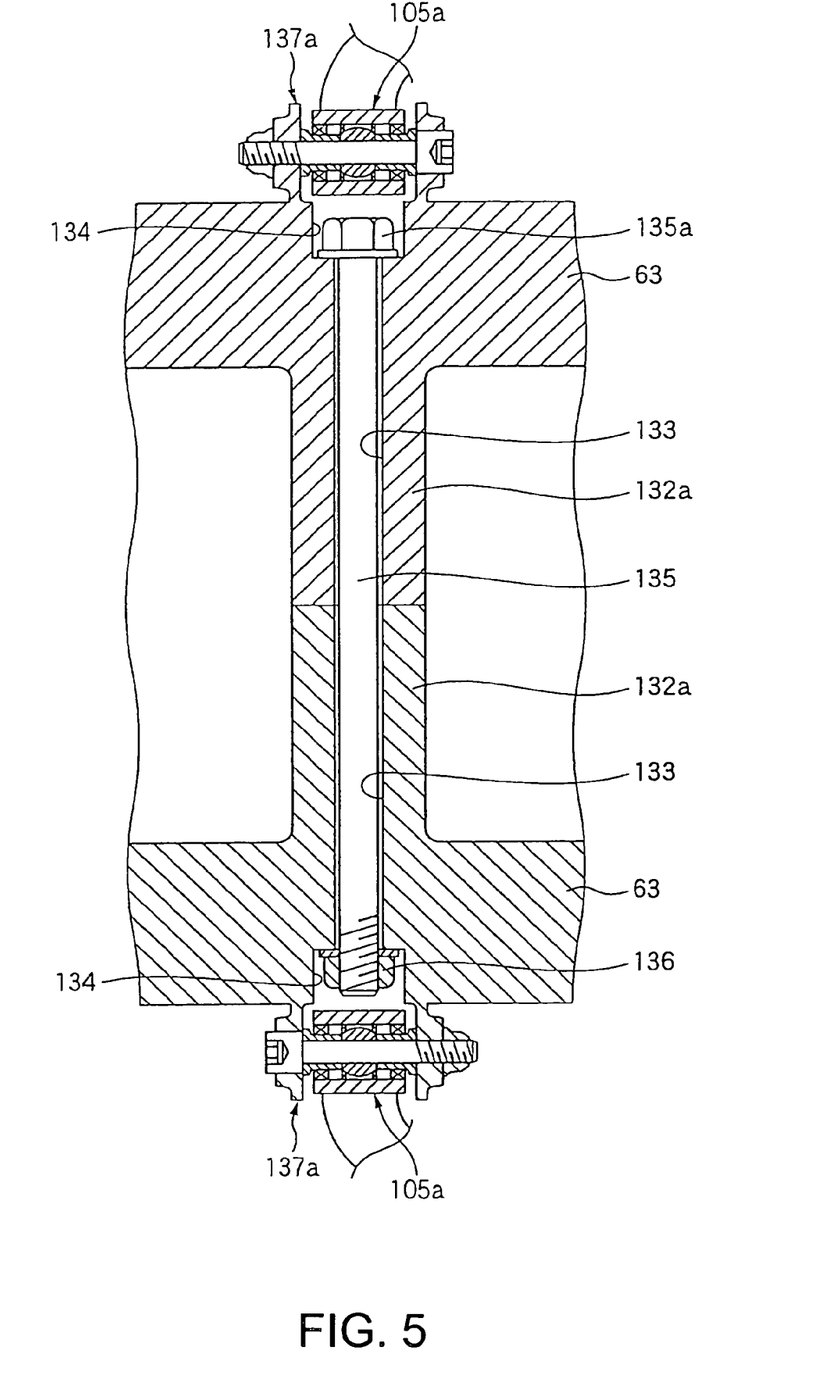
FIG. 5. is a cross-sectional view for explaining the joining structure of the support frame.

FIG. 5 is a cross-sectional view for explaining the joining structure of the support frames at the fixing boss 132a position. Here, the joining structures at the positions of the fixing bosses 132a, 132b, 132c, 132d are equal and hence, only the joining structure of the fixing boss 132a position is explained.

The fixing boss 132a projects from an inner surface side of the support frame 63, and a bolt insertion hole 133 is formed in a center thereof. Further, a spot facing portion 134 is formed in an outer surface of the support frame 63 at a position where the bolt insertion hole 133 is formed.

Further, the pair of support frames 63 is made to abut on each other so as to bring end surfaces of fixing bosses 132a into contact with each other and to allow the respective bolt insertion holes 133 to communicate with each other. In such a state, a connecting bolt 135 is inserted into the bolt insertion hole 133 from one side, and a nut 136 is threadedly engaged with the connection bolt 135 on another side and hence, the support frames 63 are fastened and fixed to each other. The connection bolt 135 has a length which is substantially equal to or slightly shorter than a distance between outer surfaces of the support frames 63 which are fastened to each other, and a head portion 135a of the connection bolt 135 and the nut 136 are arranged and housed in the inside of spot facing portions 134 without projecting from outer surfaces of the support frames 63.

As shown in FIG. 4, a final gear casing 201 has a front side thereof supported on the support frames 63 by way of a casing support bracket 205. Further, an adjustment screw hole 206 is formed in a rear portion side of the final gear casing 201, and an adjustment screw 208 which is inserted into an insertion hole 207 formed in a rear end of the support frame 63 is threaded into the adjustment screw hole 206. Further, by adjusting a threading amount of the adjustment screw 208 into the adjustment screw hole 206, a mounting position in the longitudinal direction of the final gear casing 201 is adjusted and hence, a tension of the chain 34 which is extended around a driven sprocket wheel 200 is adjusted.

Further, the upper arm 101 and the lower arm 102 which are mounted on the support frames 63 have distal end portions thereof connected to a hub 204 (see FIG. 6) of the rear wheel 17 described later and hence, the suspension arm 103 constitutes the double wishbone type independent suspension structure.

As shown in FIG. 3, the upper arm 101 includes a upper first arm portion 105 which extends in the rearward direction with respect to the support frames 63 in an inclined manner, an upper second arm portion 106 which extends at a substantially right angle with respect to the support frames 63, and a connection portion 107 which connects the upper first arm portion 105 and the upper second arm portion 106. Further, the lower arm 102 also includes a lower first arm portion 108 which extends in the rearward direction with respect to the support frames 63 in an inclined manner, an lower second arm portion 109 which extends at a substantially right angle with respect to the support frames 63, and a connection portion 110 which connects the lower first arm portion 108 and the lower second arm portion 109 (see FIG. 8).

As shown in FIG. 4, on outer surfaces of the support frames 63, four suspension arm support portions (hereinafter referred to as arm support portions) 137a, 137b, 137c, 137d which connect the upper arm 101 and the lower arm 102, that is, a cylindrical mounting portion 105a of the upper first arm portion 105, a cylindrical mounting portion 106a of the upper second arm portion 106, a cylindrical mounting portion 108a of the lower first arm portion 108, and a cylindrical mounting portion 109a of the lower second arm portion 109 are formed. Here, since the mounting structures of the suspension arms in the arm support portions 137a, 137b, 137c, 137d are identical to each other, only the mounting structure of the arm support portion 137a is explained.

The arm support portion 137a includes a support wall 138 having an approximately U-shape as viewed in a plan view which is raised from the surfaces of the support frames 63, wherein hole portions 138b which allow the insertion of a support bolt 139 therethrough are formed in mounting wall portions 138a of the support wall 138 which face each other in an opposed manner. Between the mounting wall portions 138a, the mounting portion 105a of the upper first arm portion 105, an outer lace 141 which is fixed to an inner peripheral surface of the mounting portion 105a by retainers 140, 140, an inner lace 142 which has a convex spherical surface thereof slidably fitted in a concave spherical surface formed in the outer lace 141, collars 143, 143 which are brought into contact both end surfaces of the inner lace 142, and sealing members 144, 144 which are interposed between these collars 143, 143 and the mounting portion 105a are arranged.

Further, the support bolt 139 is sequentially inserted into the mounting wall portion 138a, the collar 143, the inner lace 142, the collar 143, and the mounting wall portion 138a from a front side of the vehicle and, thereafter, a nut 145 is threaded with a distal end of the support bolt 139 whereby the upper first arm portion 105 is mounted on the arm support portion 137a in a tiltable manner in the vertical direction.

Here, four arm support portions 137a, 137b, 137c, 137d are respectively arranged in the vicinity of the fixing bosses 132a, 132b, 132c, 132d having high rigidity which allows the support frames 63 to abut on each other. Particularly, the upper support portions 137a, 137b of the upper arm 101 are arranged at positions which are aligned with the fixing bosses 132a, 132b of the support frames 63 as viewed in a side view to prevent the connecting bolts 135 and nuts 136 which are mounted on the fixing bosses 132a, 132b from being observed from the outside.

On the other hand, the arm support portions 137c, 137d of the lower arm 102 are positioned in the vicinity of a trajectory of the chain 34 as viewed in a plan view and hence, the arm support portions 137c, 137d assume positions which partially interfere with the trajectory of the chain 34. Accordingly, the lower fixing bosses 132c, 132d which are arranged in the vicinity of the arm support portions 137c, 137d are arranged at positions where the fixing bosses 132c, 132d do not interfere with the chain 34 deviated from the trajectory of the chain.

Figure 6:
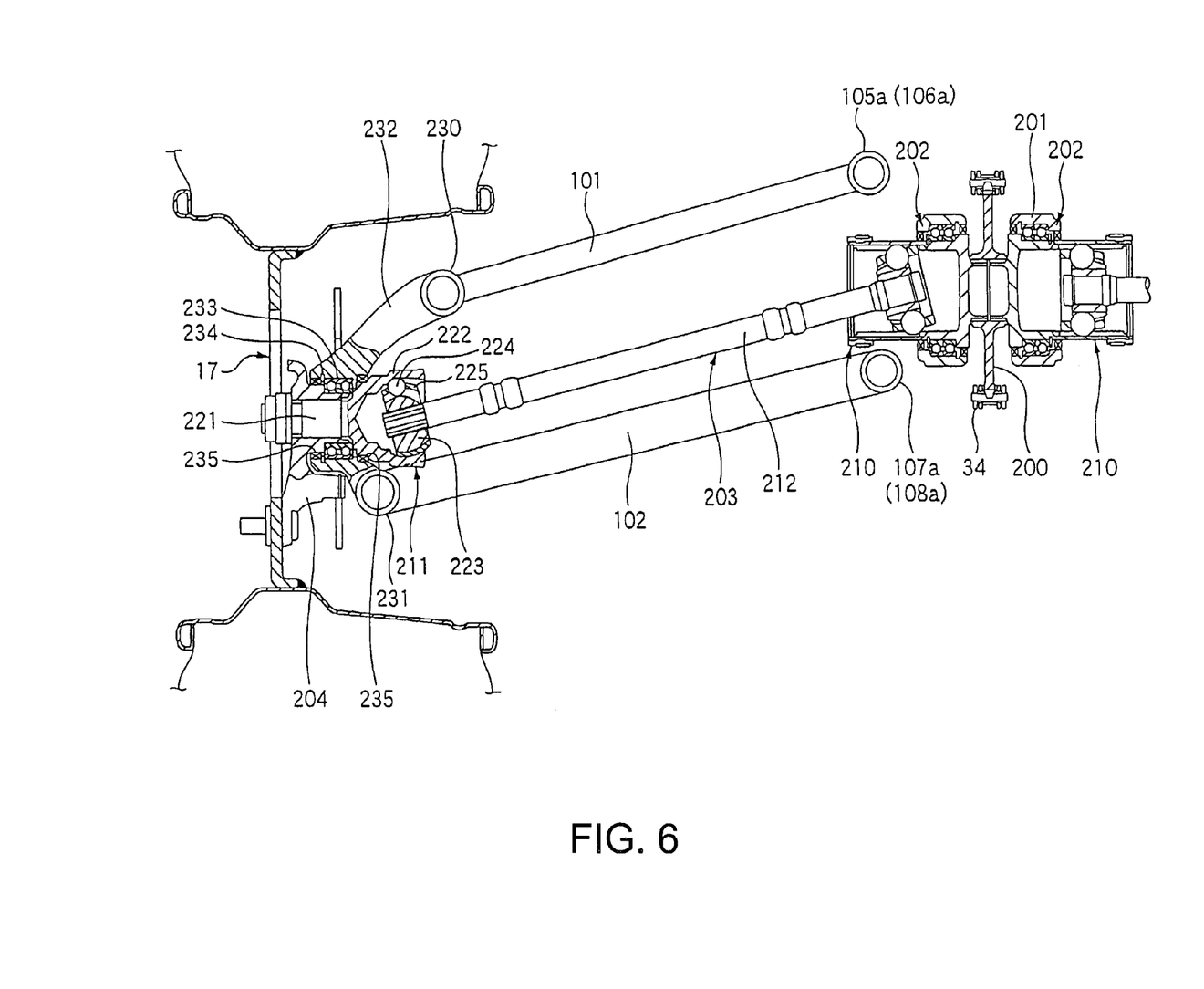
FIG. 6. is a cross-sectional view showing the structure of a drive force transmission system.

As shown in FIG. 4 and FIG. 6, the drive force transmission portion 18 includes the chain 34 which is extended between the drive sprocket wheel 33 and the driven sprocket wheel 200, the final gear casing 201 which rotatably supports the driven sprocket wheel 200 and is supported between the pair of left and right support frames, left and right drive shafts 203 which have one ends thereof supported on the final gear casing 201 by way of bearing portions 202, and hubs 204 which are connected to distal ends of these drive shafts 203, wherein the rear wheels 17 are mounted on the hubs 204.

The drive shaft 203 includes a slide-type equal velocity joint 210 which is connected to a bearing portion 202 side and is swingable, extensible and contactable in the axial direction, a fixed-type equal velocity joint 211 which is connected to a hub 204 side and is swingable, and a shaft 212 which is interposed between these equal velocity joints 210, 211.

The equal velocity joint 211 includes an outer lace 222 which is integrally formed with an axle 221 of the rear wheel 17, an inner lace 223 which is joined to one end of the shaft 212 in spline fitting, a plurality of balls 224 which are movably arranged in a plurality of ball grooves which are formed in an inner peripheral surface of the outer lace 222 and a plurality of ball grooves formed in an outer peripheral surface of the inner lace 223, and a cage 225 which holds these balls 224.

Further, distal end portions of the upper arm 101 and the lower arm 102 are connected to a knuckle arm 232 which constitutes the hub 204 in the connecting portion 230, 231, wherein the equal velocity joint 211 is rotatably supported on the knuckle arm 232 which constitutes the hub 204 by way of a bearing 233. Here, numeral 234 indicates a retainer which fixes the bearing 233, and numeral 235 indicates a sealing member.

Figure 7:
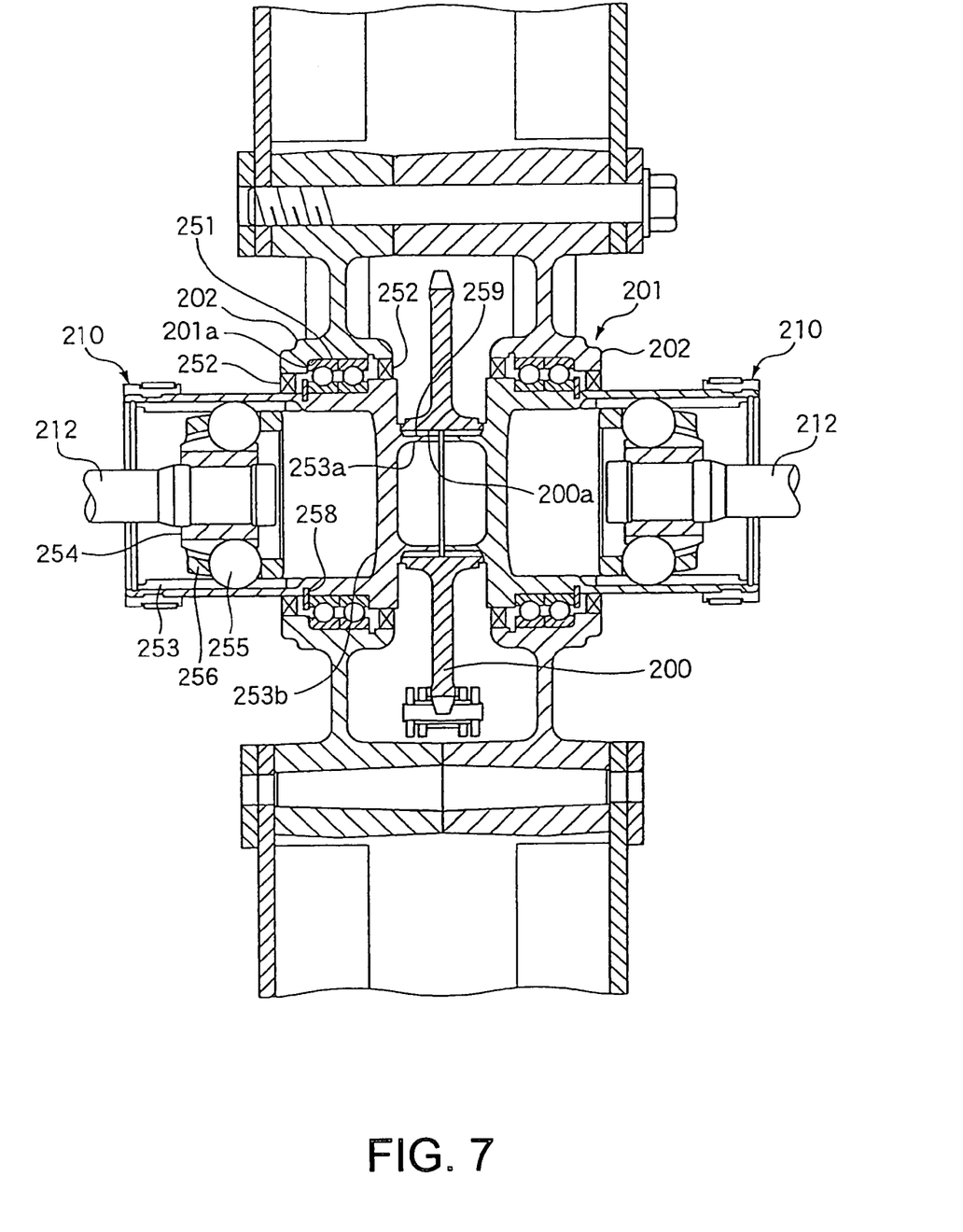
FIG. 7 is a cross-sectional view showing the structure of an essential part of the drive force transmission system.

As shown in FIG. 7, the bearing portion 202 which is supported on the final gear casing 201 includes a bearing 251 which is fitted in an inner peripheral surface of a fitting hole 201a of the final gear casing 201, and a sealing member 252 which is interposed between the fitting hole 201a and the equal velocity joint 210.

The equal velocity joint 210 includes a housing 253 which constitutes an outer lace, an inner lace 254 which is joined to another end of the shaft 212 in spline fitting, a plurality of balls 255 which are movably arranged in a plurality of ball grooves which are formed in an inner peripheral surface of the housing 253 and a plurality of ball grooves formed in an outer peripheral surface of the inner lace 254, and a cage 256 which holds these balls 255.

The housing 253 is a bottomed cylindrical member which has an outer peripheral surface thereof fitted in the bearing 251, prevents the removal of the bearing 251 with a retainer 258, and forms male splines 259 on an outer peripheral surface of a small-diameter portion 253a formed one end of the housing 253. Numeral 253b indicates a bottom surface of the housing 253.

Further, these housings 253 are mounted on the final gear casing 201 in a state that the housings 253 are arranged close to each other, and female splines 200a of the driven sprocket 200 are joined to the respective male spline 259 of these housings 253 by spline fitting.

Figure 8:
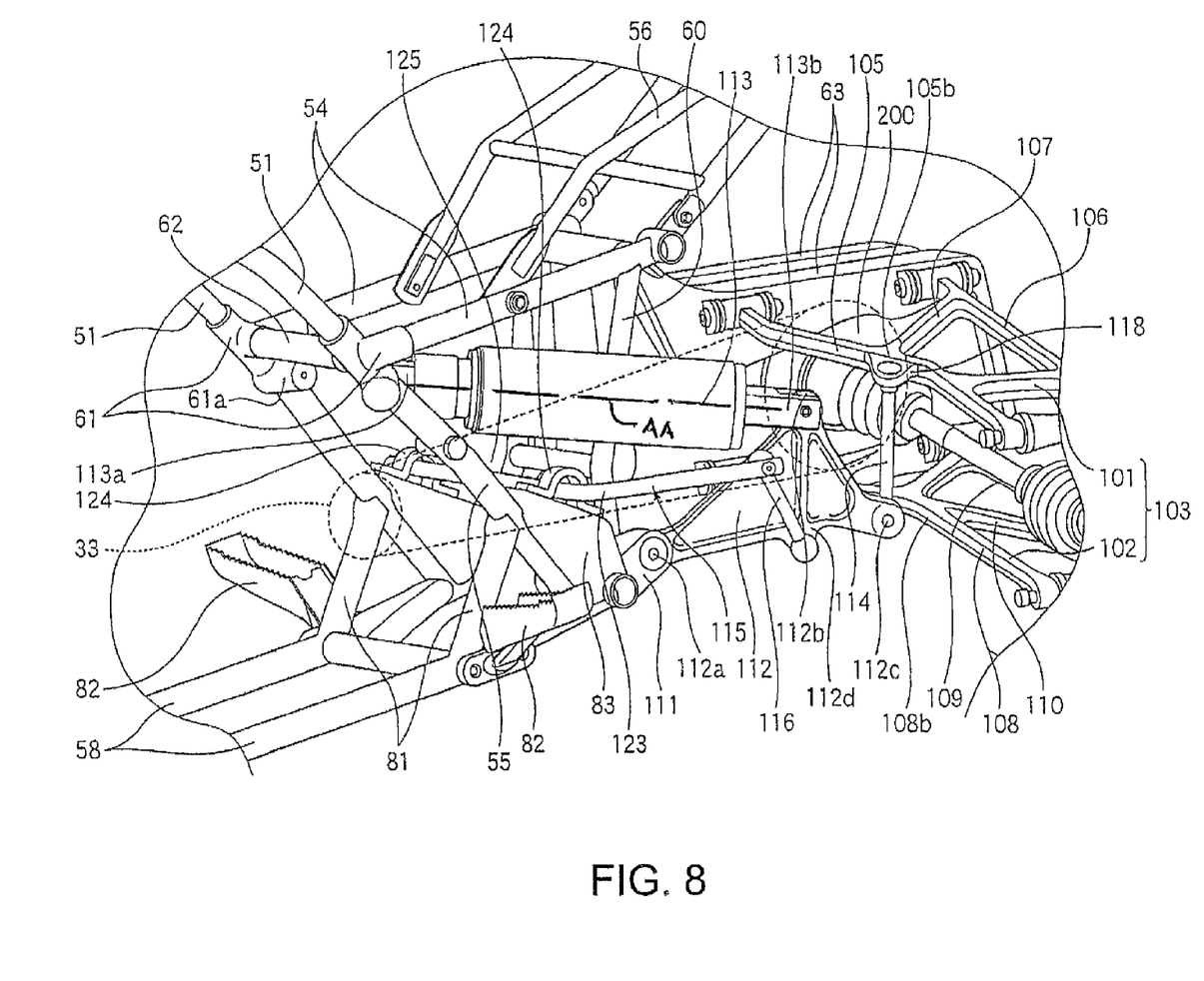
FIG. 8. is a perspective view of an essential part showing the support structure on a left rear wheel side mounted on the vehicle body frame.
Figure 9:
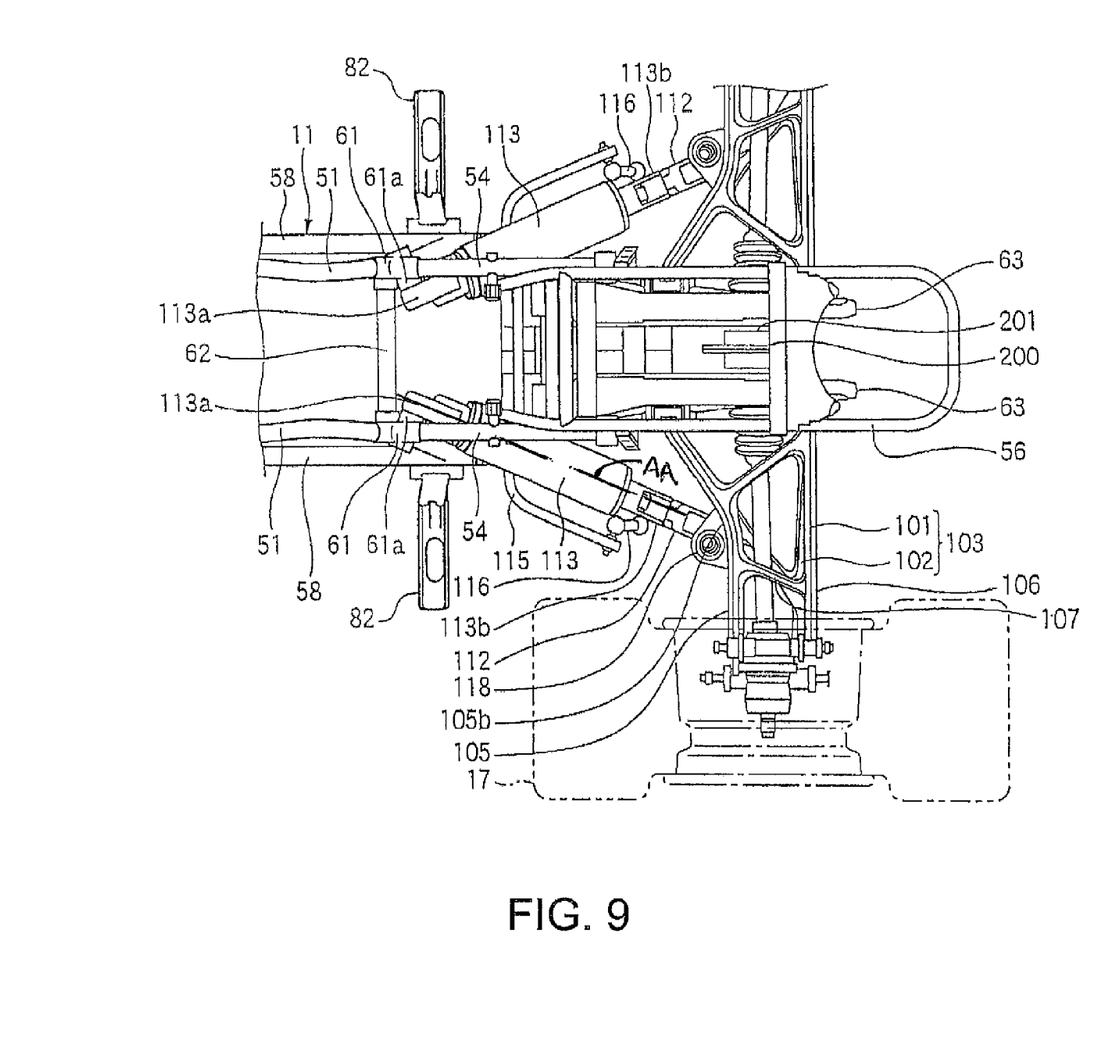
FIG. 9. is a top plan view showing the support structure on the rear wheel side.

FIG. 8 is a perspective view of an essential part showing the support structure on a left rear wheel side which is mounted on the vehicle body frame, and FIG. 9 is an upper view showing the support structure on the rear wheel side. As shown in FIG. 8 and FIG. 9, between the vehicle body frame 11 and the suspension arm 103, the link member 112, the cushion unit 113 and a push rod 114 are tiltably arranged.

At a portion where a rear end of the lower frame 58 and a lower end of the rear second inclined frame 60 are connected to each other, a link mounting portion 111 is provided, and to the link mounting portion 111, a link member 112 is obliquely connected in a state that the link member 112 is gradually separated from the vehicle body frame 11 in the vehicle body width direction as the link member 112 extends in the rearward direction. The link member 112 is formed in an approximately triangular shape in a plan view, wherein a first apex portion 112a which is positioned at a front portion is rotatably connected to the link mounting portion 111, a second apex portion 112b which is positioned at an upper side of an intermediate portion is rotatably connected to the cushion unit 113, and a third apex portion 112c which is positioned at a rear portion is rotatably connected to a lower end of the push rod 114. Further, a bottom portion 112d which is positioned below the intermediate portion is rotatably connected to one end of the connecting rod 116 of the stabilizer 115.

The cushion unit 113 is arranged such that an axis AA thereof disposed directly above the link member 112, and is rotatably connected to a cushion support portion 61a of the joint member 61 which constitutes a gathering portion to which the front upper frame 51, the rear upper frame 54, the rear first inclined frame 55 and the connection frame 62 are connected with each other. The cushion support portion 61a of the joint member 61 is arranged on the inside of the vehicle body frame 11 and, at the same time, on the approximately inside of the vehicle body width direction of the step 82 as viewed from above.

Accordingly, in the cushion unit 113, a first end portion 113a thereof which has one end thereof supported on the cushion support portion 61a of the vehicle body frame 11 is positioned inside of the vehicle body width direction of the vehicle body frame 11, and a second end portion 113b which is supported on the link member 112 which constitutes the suspension arm 103 side is positioned outside of the vehicle body width direction of the vehicle body frame 11. Further, with respect to the cushion unit 113, the first end portion 113a and the second end portion 113b are arranged in a displaced manner in the longitudinal direction of the vehicle body such that the axis AA of the cushion unit 113 extends in the longitudinal direction of the vehicle body while intersecting the vehicle body frame 11. As can be seen in FIG. 9, when the cushion mounting structure is viewed from above, the cushion unit 113 is aligned directly above a forward part of the link member 112. Due to such a constitution, it is possible to ensure an elongated stroke length of the cushion unit 113 without difficulty whereby it is possible to surely absorb an impact which is transmitted from the rear wheel 17 by way of the suspension arm 103, the push rod 114 and the link member 112.

Further, the first apex portion 112a of the link member 112 which is connected to the link mounting portion 111 is positioned behind the first end portion 113a of the cushion unit 113 which is supported on the joint member 61 in the rearward direction of the vehicle body, wherein the first apex portion 112a is arranged close to the second end portion 113b of the cushion unit 113 so as to make a tilting radius of the link member 112 small due to stroking of the cushion unit 113.

The push rod 114 which is connected to the third apex portion 112c of the link member 112 is arranged in a state that the axis of the push rod 114 becomes substantially parallel to the link member 112, and an upper end of the push rod 114 is tiltably connected to the upper arm 102 by way of the ball joint 118. Accordingly, the link member 112 is tilted about the link mounting portion 111 corresponding to a stroke of the cushion unit 113, wherein the tilting direction of the link member 112 is different from the tilting direction of the upper arm 101 and the lower arm 102. That is, the tilting direction of the link member 112 is approximately orthogonal to the tilting direction of the upper arm 101 and the lower arm 102.

The ball joint 118 is mounted on an escape portion 105b which is formed in a bending shape in an intermediate portion of the upper first arm 105 such that it is possible to prevent the interference of the ball joint 118 with the cushion unit 113 and the link member 112. Here, a similar escape portion 108b is formed in an intermediate portion of the lower first arm portion 108.

Figure 10A:
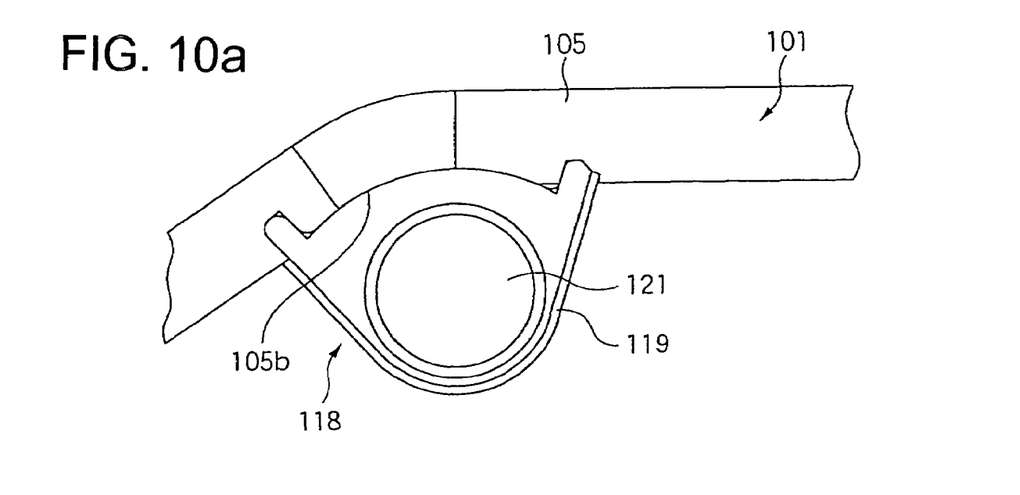
FIGS. 10(a) and 10(b), respectively, are a plan view and a cross-sectional view for explaining the structure of the ball joint.
Figure 10B:
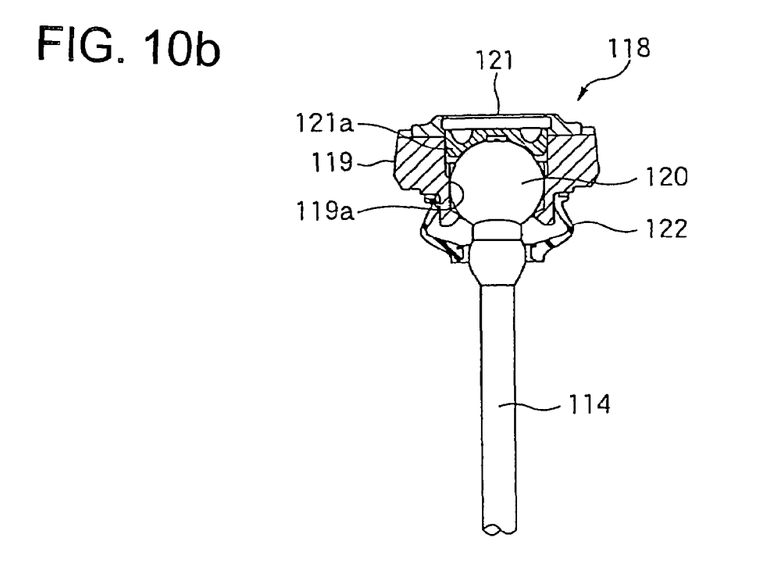

As shown in FIG. 10(a) and FIG. 10(b), the ball joint 118 includes a housing 119 which is fixed to the upper arm 101 and includes a housing hole 119a, a ball portion 120 which is fixed to a distal end of the push rod 114 and is arranged in the housing hole 119a of the housing 119, and a plug 121 which is formed in an opening portion on an upper portion side of the housing 119 and includes a bearing portion 121a which is slidably brought into contact with the ball portion 120. Due to such a constitution, the ball portion 120 is slidably held in the inside of the housing hole 119a of the housing 119, and the push rod 114 becomes tiltable with respect to the upper arm 101. Further, a resin-made boot 122 which covers an opening portion formed below the housing 119 is mounted on the housing 119. The boot 122 prevents the intrusion of dusts, water and the like into the inside of the housing 119 while allowing the tilting of the push rod 114.

The stabilizer 115 which has one ends of the connecting rods 116 connected to a bottom portion of the intermediate portion of the link member 112 includes the pair of left and right connecting rods 116, and a stabilizer body 123 which connects other ends of the connecting rods 116. The stabilizer body 123 has an intermediate portion thereof held on a pair of left and right reinforcing plates 83 by way of the support bracket 124 and is inserted into a space portion 125 which is formed by a front upper frame 51 which constitutes the vehicle body frame 11, the cushion unit 113 and the link member 112. Further, both end portions of the stabilizer body 123 which projects from the pair of reinforcing plates 83 are bent in the rearward direction and extend substantially parallel to the link member 112, and are connected to another ends of the pair of left and right connecting rods 116.

In the saddle-ride type vehicle 10 having the above-mentioned structure, when the rear wheel 17 receives an impact from a ground during traveling, the suspension arm 103 which supports the rear wheel 17 is tilted and, further, the link member 112 is tilted by way of the push rod 114 which is connected to the suspension arm 103 by the ball joint 118. Accordingly, the impact of the rear wheel 17 is transmitted to the cushion unit 113 which is connected to the link member 112 and the vehicle body frame 11 and is arranged along the longitudinal direction of the vehicle body and is surely absorbed by the cushion unit 113. Accordingly, the transmission of the impact from the rear wheel 17 to the vehicle body frame 11 is largely suppressed thus ensuring the favorable riding comfort of the vehicle 10.

As has been explained heretofore, according to the cushion mounting structure of the saddle-type vehicle 10 of the above-mentioned embodiment, the cushion unit 113 is arranged such that the first end portion 113a which is supported on the vehicle body frame 11 is positioned inside the vehicle body frame 11 in the vehicle body width direction and the second end portion 113b which is supported on the suspension arm 103 side is positioned outside the vehicle body frame 11 in the vehicle body width direction, and the axis thereof extends in the longitudinal direction of the vehicle body while intersecting the vehicle body frame 11 and hence, it is possible to elongate the stroke length of the cushion unit 113 without difficulty.

Accordingly, it is possible to extremely smoothly absorb an impact from the rear wheel 17 by the cushion unit 113 and hence, a favorable cushion performance can be obtained whereby a favorable riding comfort can be ensured and, at the same time, the vehicle can be preferably used as a saddle-ride type vehicle 10 for traveling on a terrain.

Further, the first end portion 113a of the cushion unit 113 is arranged approximately inside the steps 82 on which a driver places his/her feet at the time of traveling in the vehicle body width direction and hence, it is possible to arrange the cushion unit 113 having the elongated stroke length in the longitudinal direction of the vehicle body without difficulty whereby it is possible to obtain the more favorable cushion performance.

Further, the first end portion 113a of the cushion unit 113 is mounted on the gathering portion (joint member 61) of the vehicle body frame to which the front upper frame 51, the rear upper frame 54, the rear first inclined frame 55 and the connecting frame 62 which constitute the plurality of frame members are connected and hence, it is possible to surely support the cushion unit 113 which absorbs the impact from the wheel 17 at the gathering portion having the high rigidity whereby the rigidity of the vehicle body frame 11 can be enhanced.

Further, the escape portions 105b, 108b which prevent the interference between the cushion unit 113 which extends and contracts and the tilting link member 112 are formed in the suspension arm 103 and hence, it is possible to smoothly extend and contract the cushion unit 113 while preventing the cushion unit 113 from interfering with the suspension arm 103 whereby the more favorable cushion performance can be obtained.

As has been explained heretofore, according to the cushion mounting structure of the saddle-ride type vehicle 10 of the above-mentioned embodiment, the link member 112 which supports the cushion unit 113 is connected to the suspension arm 103 by way of the rod 114 in a state that the link member 112 is tiltable in the direction different from the tilting direction of the suspension arm 103, and the cushion unit 113 is arranged such that the first end portion 113a and the second end portion 113b of the cushion unit 113 are positioned in a displaced manner in the longitudinal direction of a vehicle body and hence, an axis of the cushion unit 113 extends in the longitudinal direction of the vehicle body and it is possible to elongate a stroke length of the cushion unit 113 without difficulty whereby an impact from the wheel 17 can be extremely smoothly absorbed by the cushion unit 13 thus enabling the acquisition of the favorable cushion performance and ensuring the favorable riding comfort.

Further, the link member 112 is arranged substantially parallel to the cushion unit 113 and hence, it is possible to arrange the cushion unit 113 having the elongated stroke length along the longitudinal direction of the vehicle body frame 11 without difficulty thus enabling the acquisition of the more favorable cushion performance.

Further, the first end portion 113a of the cushion unit 113 is positioned inside in the vehicle body width direction of the vehicle body frame 11 and hence, it is possible to arrange the cushion unit 113 having the elongated stroke length along the longitudinal direction of the vehicle body frame 11 without difficulty thus enabling the acquisition of the more favorable cushion performance.

Further, the first apex portion 112a which constitutes the mounting portion of the link member 112 with the vehicle body frame 11 is positioned at the portion of the vehicle body behind the first end portion 113a of the cushion unit 113 and hence, it is possible to arrange the first apex portion 112a close to the second end portion 113b of the cushion unit so as to make a tilting radius of the link member 112 attributed to a stroke of the cushion unit 113 small whereby it is possible to enhance the cushion performance due to the favorable tilting operation of the link member 112.

Further, the escape portions 105b, 108b which prevent the suspension arm 103 from interfering with the tilting link member 112 are formed in the suspension arm 103 and hence, it is possible to tilt the link member 112 smoothly by preventing the link member 112 from interfering with the suspension arm 103 whereby the more favorable cushion performance can be obtained.

The cushion mounting structure further includes the stabilizer 115 which is connected to the link member 112 and hence, compared to a case in which the stabilizer 115 connects the suspension arms to each other, it is possible to simplify the structure of the suspension arm 103 and the stabilizer 115 can be also machined easily.

Further, the stabilizer 115 is inserted into the space portion 125 formed by the vehicle body frame 11, the link member 112 and the cushion unit 113 and hence, it is possible to arrange the stabilizer 115 in the vehicle body width direction without difficulty whereby it is possible to effectively make use of the space.

In addition, the rod 114 is connected to the suspension arm 103 using the ball joint 118 and hence, it is possible to smoothly transmit the behavior of the suspension arm 103 to the link member 112 by way of the rod 114 and, at the same time, it is possible to ensure the favorable behavior of the suspension arm 103.

As has been explained heretofore, according to the cushion mounting structure of the vehicle used in the saddle-ride type vehicle 10 according to the above-mentioned embodiment, the fixing bosses 132a, 132b, 132c, 132d which join the pair of support frames 63 are provided more inside than outer peripheries of the pair of support frames 63 and, at the same time, in the vicinity of the suspension arm support portions 137a, 137b, 137c, 137d and hence, even when the fixing bosses 132a, 132b, 132c, 132d are arranged inside the pair of support frames 63, it is possible to surely fix the pair of support frames 63. Further, since the fixing bosses 132a, 132b, 132c, 132d are formed in a state that the fixing bosses 132a, 132b, 132c, 132d are concealed by the suspension arm 103, it is possible to enhance the appearance of the saddle-ride type vehicle 10. Further, since the fixing bosses 132a, 132b, 132c, 132d are provided in the vicinity of the suspension arm support portions 137a, 137b, 137c, 137d, it is possible to enhance the rigidity of the suspension arm support portions 137a, 137b, 137c, 137d.

Further, the fixing bosses 132a, 132b which join the pair of support frames 63 are covered with suspension arm support portions 137a, 137b and hence, it is possible to enhance the appearance of the saddle-ride type vehicle 10. Further, it is possible to enhance the rigidity of the suspension arm support portions 137a, 137b. Here, at least one of the fixing bosses 132a, 132b, 132c, 132d for joining the pair of support frames 63 may be covered with other member. In this case, it is also possible to enhance the appearance of the saddle-ride type vehicle 10.

Further, the connecting bolts 135 and the fixing nuts 136 which join the pair of support frames 63 at the fixing bosses 132a, 132b, 132c, 132d are arranged in a state that the connecting bolts 135 and the fixing nuts 136 are not projected from outer surfaces of the support frames 63 and hence, it is possible to further enhance the appearance of the saddle-ride type vehicle 10.

Further, the fixing bosses 132a, 132b, 132c, 132d are arranged at positions away from the trajectory of the chain 34 which transmits the drive force to the wheels 17 and hence, it is possible to prevent the fixing bosses 132a, 132b, 132c, 132d from interfering with the chain 34.

Further, at least one of the pair of support frames 63 includes the positioning bosses 131 and the fixing bosses 132a, 132b, 132c, 132d which are formed in the inside of a vehicle body and hence, there is no possibility that the periphery of the chain 34 is completely covered with the positioning bosses 131 and the fixing bosses 132a, 132b, 132c, 132d whereby the maintenance property can be enhanced and, at the same time, the rigidity of the pair of support frames 63 can be ensured.

Further, according to this embodiment, as fixing portions and the boss portions, fixing bosses 132a, 132b, 132c, 132d are used and the boss portions formed inside the vehicle body are formed on the extension line of the fixing portion for joining the pair of divided frames and hence, it is possible to simplify the inner constitution of the pair of support frames 63. Since there is no possibility that the periphery of the chain 34 is completely covered with the pair of support frames 63, the maintenance property can be enhanced. Further, it is also possible to ensure the rigidity of the pair of support frames 63.

What is claimed is:

1. A cushion mounting structure of a saddle-ride vehicle having at least a pair of left and right wheels, comprising:

a suspension arm which is tiltably connected to a vehicle body frame, extends in a vehicle body width direction, and suspends the wheels; and a cushion unit which includes a first end portion which is supported on the vehicle body frame and a second end portion which is supported on a suspension arm side, and absorbs an impact transferred to the wheels, wherein the cushion unit is arranged such that the first end portion is positioned inside the vehicle body frame in the vehicle body width direction and the second end portion is positioned outside the vehicle body frame in the vehicle body width direction, and an axis AA thereof extends in the longitudinal direction of a vehicle body while intersecting the vehicle body frame, wherein the suspension arm includes an upper arm and a lower arm, the first end portion of the cushion unit being supported on the vehicle body frame, and the second end portion of the cushion unit being supported on the upper arm by a link member and a push rod, and when the cushion mounting structure is viewed from above, the cushion unit is aligned directly above at least a forward part of the link member.

2. The cushion mounting structure of a saddle-ride vehicle according to claim 1, wherein the cushion mounting structure further includes a pair of steps which extends to the outside of the vehicle body frame in the vehicle body width direction from the vehicle body frame, and the first end portion of the cushion unit is arranged approximately between the steps in the vehicle body width direction.

3. The cushion mounting structure of a saddle-ride vehicle according to claim 1, wherein a gathering portion to which a plurality of frame members are connected is mounted on the vehicle body frame, and the first end portion of the cushion unit is mounted on the gathering portion.

4. The cushion mounting structure of a saddle-ride vehicle according to claim 1, wherein an escape portion which prevents the suspension arm from interfering with the cushion unit which extends and contracts is formed in the suspension arm.

5. The cushion mounting structure of a saddle-ride vehicle according to claim 1, wherein link member is approximately triangular in shape in a plan view, and includes a forward apex, an upper apex, and a rear apex, and wherein a lower end of the push rod is tiltably connected to the rear apex.

6. The cushion mounting structure of a saddle-ride vehicle according to claim 1, wherein an upper end of the push rod is tiltably connected to an escape portion of the upper arm, and wherein the push rod extends in a direction that is substantially vertical.

7. The cushion mounting structure of a saddle-ride vehicle according to claim 1, wherein the first end portion of the cushion unit is rotatably connected to a gathering portion to which a plurality of frame members are connected is mounted on the vehicle body frame, and when viewed from above, the gathering portion being between in a vehicle body direction of a pair of steps on which a rider places a foot.

8. A cushion mounting structure of a saddle-ride vehicle having at least a pair of left and right wheels, comprising:

a suspension arm which is tiltably connected to a vehicle body frame, extends in a vehicle body width direction, and suspends the wheels; and a cushion unit which includes a first end portion which is supported on the vehicle body frame and a second end portion which is supported on a suspension arm side, and absorbs an impact transferred to the wheels, wherein the cushion unit is arranged such that the first end portion is positioned inside the vehicle body frame in the vehicle body width direction and the second end portion is positioned outside the vehicle body frame in the vehicle body width direction, and an axis AA thereof extends in the longitudinal direction of a vehicle body while intersecting the vehicle body frame, wherein an intermediate portion of the suspension arm is bent in a rearward direction in order to prevent interference with the cushion unit which extends and contracts, wherein the suspension arm includes an upper arm and a lower arm, the first end portion of the cushion unit being supported on the vehicle body frame, and the second end portion of the cushion unit being supported on the upper arm by a link member and a push rod, wherein the push rod extends in a direction that is substantially vertical and includes an upper end of the push rod is tiltably connected to an escape portion of the upper arm.

9. The cushion mounting structure of a saddle-ride vehicle according to claim 8, wherein the cushion mounting structure further includes a pair of steps which extends to the outside of the vehicle body frame in the vehicle body width direction from the vehicle body frame, and the first end portion of the cushion unit is arranged approximately between the steps in the vehicle body width direction.

10. The cushion mounting structure of a saddle-ride vehicle according to claim 8, wherein a gathering portion to which a plurality of frame members are connected is mounted on the vehicle body frame, and the first end portion of the cushion unit is mounted on the gathering portion.

11. The cushion mounting structure of a saddle-ride vehicle according to claim 8, wherein an escape portion which prevents the suspension arm from interfering with the cushion unit which extends and contracts is formed on the bent portion of the suspension arm.

12. The cushion mounting structure of a saddle-ride vehicle according to claim 8, wherein link member is approximately triangular in shape in a plan view, and includes a forward apex, an upper apex, and a rear apex, and wherein a lower end of the push rod is tiltably connected to the rear apex.

13. The cushion mounting structure of a saddle-ride vehicle according to claim 8, and when the cushion mounting structure is viewed from above, the cushion unit is aligned directly above at least a forward part of the link member.

14. The cushion mounting structure of a saddle-ride vehicle according to claim 8, wherein the first end portion of the cushion unit is rotatably connected to a gathering portion to which a plurality of frame members are connected is mounted on the vehicle body frame, and when viewed from above, the gathering portion being between in a vehicle body direction of a pair of steps on which a rider places a foot.

15. A cushion mounting structure of a saddle-ride vehicle having at least a pair of left and right wheels, comprising:

a suspension arm which is tiltably connected to a vehicle body frame, extends in a vehicle body width direction, and suspends the wheels; and a cushion unit which includes a first end portion which is supported on the vehicle body frame and a second end portion which is supported on a suspension arm side, and absorbs an impact transferred to the wheels, wherein the cushion unit is arranged such that the first end portion is positioned inside the vehicle body frame in the vehicle body width direction and the second end portion is positioned outside the vehicle body frame in the vehicle body width direction, and an axis AA thereof extends in the longitudinal direction of a vehicle body while intersecting the vehicle body frame, wherein the suspension arm includes an upper arm and a lower arm, the first end portion of the cushion unit being supported on the vehicle body frame, and the second end portion of the cushion unit being supported on the upper arm by a link member and a push rod, and wherein said link member is approximately triangular in shape in a plan view, and includes a forward apex, an upper apex, and a rear apex, and wherein a lower end of the push rod is tiltably connected to the rear apex.

* * * * *